April 14, 1970     T. R. THOMAS     3,506,091
FLUORINATED SILICONE VALVE METER UNIT
Filed March 20, 1968
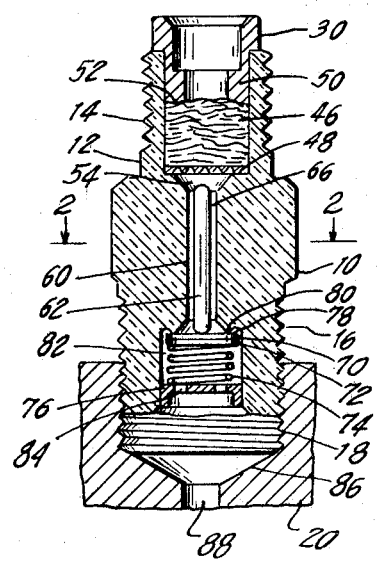
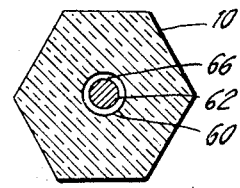
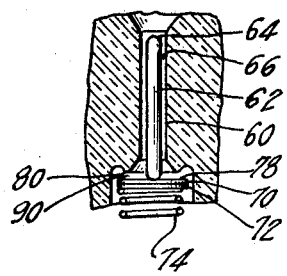
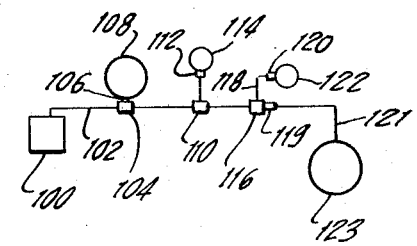
INVENTOR.
THOMAS R. THOMAS, DECEASED
BY IVAH M. THOMAS, ADMINISTRATRIX
BY
OSTROLENK, FABER, GERB & SOFFEN
ATTORNEYS

United States Patent Office 3,506,091
Patented Apr. 14, 1970

3,506,091
FLUORINATED SILICONE VALVE METER UNIT
Thomas R. Thomas, deceased, late of Bronx, N.Y., by Ivah M. Thomas, administratrix, Guilford, Conn., assignor to Auto Research Corporation, Boonton, N.J., a corporation of Delaware
Continuation-in-part of application Ser. No. 624,976, Mar. 20, 1967, which is a continuation-in-part of application Ser. No. 347,525, Feb. 26, 1964. This application Mar. 20, 1968, Ser. No. 714,752
Int. Cl. F16k *51/00;* F16n *25/00*
U.S. Cl. 184—7                                    5 Claims

ABSTRACT OF THE DISCLOSURE

A meter unit used in a centralized lubricating installation which has a central pump and branch conduits leading to a plurality of the meter units, each meter unit being located at a particular bearing or point to be lubricated, each meter unit apportioning the volume of lubricant flow to its respective bearing or point; the meter unit having a check valve with the valve seat thereof being formed of a fluorinated silicone which is a resilient synthetic rubber that does not shrink, harden, swell, soften, lose its resiliency or disintegrate when high or low aniline point lubricants are pumped through the meter unit at elevated or low temperatures.

---

This is a continuation-in-part of application Ser. No. 624,976 filed on Mar. 20, 1967, now abandoned, which is in turn a continuation-in-part of application Ser. No. 347,525 filed on Feb. 26, 1964, now abandoned.

The present invention relates to a lubricant flow apportioning meter unit for a centralized lubricating installation and particularly to a fluorinated silicone valve polymer seat for a check valve within the bore of said meter unit.

A single machine often has a plurality of bearings or points each of which requires lubrication. Centralized lubricating installations are known which pump lubricant from a central reservoir through a plurality of branch conduits to the various bearings and points requiring lubrication on a single machine or on a plurality of machines. The total lubricant flow must be correctly apportioned among the various bearings or points. It is conventional to mount adjacent each bearing or point to be lubricated a flow restriction meter unit through which the lubricant first passes to get to the bearing or point being lubricated. The meter unit has a restriction device in the path of flow through the meter unit which restricts the rate of flow to the bearing or point. The flow meter units are of the high restriction type which have a flow obstruction effect many times greater than the total obstruction effect of the conduit system and of the bearings or points being lubricated so that the flow meter units have a predominating influence on flow apportionment and in themselves regulate the distribution of lubricant among the bearings or points.

A lubricating installation employing a meter unit may be used with any type of machinery requiring lubrication and the present invention is to be in no way limited by the particular type of machinery being lubricated. Also, a meter unit designed in accordance with the present invention may be used with any conventional lubricant pumping device, including a rotating gear pump, a piston pump, a wobble wheel pump, an eccentric cam pump, et al.

Every meter unit has a longitudinal bore therethrough with a restriction device therein for permitting a predetermined lubricant rate of flow through the meter unit. The restriction device may comprise a narrow diameter section of the bore, or a pin in the bore of a diameter such that the pin nearly fills the bore, or an elongated narrow spiral passageway or other type.

It is desirable to provide a check valve in the bore of the meter unit, which valve is spring biased closed in order to prevent backflow of lubricant when it is not being pumped. The valve is opened by the pressure of incoming lubricant while lubricant is being pumped through the meter unit. Previous experience with check valves in meter units has shown that since the rate of flow through a meter unit is small, as lubricant is pumped through the meter unit, the check valve need only open to a very small extent, on the order of .001 inch, to permit lubricant to pass thereby. Despite the fact that the lubricating installation is provided with a filter and each meter unit has its own filtering element, the lubricant passing through the check valve still contains dirt and impurities which will become caught in the small opening through the check valve, will foul the check valve and will prevent it from properly closing to prevent backflow and from opening to permit proper forward flow.

To overcome this drawback, it has been found useful to use the pin-in-bore flow restriction device with the pin floating in the bore. The pin is on the upstream side of the check valve. The flow of lubricant being pumped under pressure presses on the upstream end of the pin. The area of this upstream end is rather large in comparison with the area of the narrowed opening through the bore that apportions the rate of the lubricant flow. The pressure on the upstream end of the pin presses the pin against the check valve, and the pressure of the pin on the check valve, in addition to the pressure exerted by the lubricant passing the check valve, causes the check valve to open to a much greater extent, thereby permitting free bypassage of lubricant without the impurities catching in the check valve and fouling it.

A normal check valve consists of a movable valve element positioned in the path of flow of the lubricant. The element is normally spring biased against an annular valve seat that surrounds the opening through the bore, whereby when the valve element is in engagement with the valve seat, the opening of the bore is closed. To provide secure liquid-tight engagement between the valve element and valve seat, one of them is preferably formed of resilient material.

The valve seat normally comprises an annular ring within the bore of the meter unit that may be formed within the bore during the actual boring of the meter unit. The annular ring provides a relatively small surface area to contact the valve element biased into engagement with it, whereby the pressure on the valve element at its ring of contact with the annular valve seat enables the valve to be securely closed. It is desirable that the valve element, therefore, be the element that is comprised of resilient material so that the valve seat slightly sinks into the material of the valve element, thereby further ensuring the secureness of the closure of the valve.

A meter unit may be using in many different installations where various materials held at various temperatures are used to lubricate the bearings and points. For example, if lubricant is held at elevated temperatures of the order of 150° F., were a valve material comprised of a rubber, such as neoprene, the high temperature would cause the rubber to swell and become soft and lose its resiliency. Flow would be blocked and the valve seat would permanently indent the now non-resilient valve material. Some plastics now used for valve material because they have the needed resiliency, such as polyvinyl chloride, adversely react to high or low aniline point lubricating oils by swelling and becoming soft and non-resilient or shrinking and becoming inflexible and brittle.

For a valve material of general usefulness, it has been found that silicones produce best results under varying conditions. A silicone polymer compound is a semi-organic polymer comprised of a chain of hydrogen and silicon atoms. These can withstand exposure to lubricant at elevated temperatures and, exposure to high aniline point lubricating oils. But silicones swell and become soft when exposed to low aniline point oils, e.g. oils falling within the aromatic range, such as kerosene.

It has been found, however, that if a fluorinated silicone polymer material is used, i.e. a material where fluorine atoms are substituted for some of the hydrogen atoms in the long chain silicone polymer, the properties of resilience, and failure to shrink, harden, swell, soften, or disintegrate are maintained for an extended period of use with lubricant held at either high or low temperatures, which lubricant may be of either high or low aniline point type. Such a material may be a filled rubber which is based upon trifluoropropyl-methylsiloxane units, sold by Dow Corning Co. and comprising a proprietary composition of their registered trademark products Silastic® LS–63U Fluorosilicone Rubber and Silastic® LS–422 Base. A more preferred material is a proprietary fluorinated silicone polymer substance sold by Ronthor Reiss Corp., U.S. 46, Little Falls, N.J.

A valve element usually consists of a disc of resilient material which may be mounted upon a rigid backing plate, and which has in engagement with it a biasing means for biasing it against the valve seat within the bore of the meter unit. To manufacture these discs, an elongated wide sheet having a thickness of the desired thickness of the valve element, and comprised of the desired material for the valve element, is formed. The sheet is then slitted into elongated strips and a punch or die then punches or cuts the discs from each of the elongated strips.

Some substances other than fluorinated silicone but having its desirable properties also undesirably have a "memory." When a sheet of these materials is slitted, the edges of the resulting elongated strips curl. This makes mechanized handling of the strips more difficult than if the strips remain flat after slitting. Also, when individual discs are punched or cut from an elongated strip, the periphery of the discs will "remember" the curl of the elongated strips and will similarly curl. In addition, each disc will curl around its periphery due to the punching or cutting operation which removes each of them from the elongated strip. When working with a large number of individual discs, and if each of the discs is curled, it is much more difficult to mechanically handle them and to properly position and secure them to a backing plate.

Fluorinated silicone, on the other hand, does not have a "memory." Accordingly, sheets of that material may be slitted and the resulting strips of that material may be punched or cut to form discs, the peripheries of which are not curled in any way due to the cutting or punching operations performed upon the silicone material.

In view of the foregoing, it is a primary object of the present invention to provide for a meter unit used in a centralized lubricating installation, a check valve element which remains resilient and does not change its size or properties over the full range of high to low aniline point oil lubricants.

It is a further object of the present invention to provide such a valve element of a material which retains its resilience and size properties over the full range of temperatures at which oil lubricant will normally be pumped.

It is another object of the present invention to provide such a valve element of a material which may be readily handled in the manufacture of the valve element.

It is another object of the present invention to provide such a material which will not shrink, harden, become brittle, swell, become soft, disintegrate or otherwise become nonuseful during normal extended term continuous use in a meter unit.

These and other objects of the present invention will become apparent when the following description is read in conjunction with the accompanying drawings in which:

FIGURE 1 is a longitudinal sectional view showing a meter unit containing a valve having a valve element designed in accordance with the present invention, the valve being in the closed position;

FIGURE 2 is a transverse sectional view taken upon the line 2—2 of FIGURE 1 showing the flow restricting pin in the central bore of the meter unit;

FIGURE 3 is a fragmentary sectional view of the meter unit in FIGURE 1 showing the valve in the open position; and FIGURE 4 is a schematic view of a central lubricating installation using a meter unit designed with valve elements in accordance with the present invention.

Referring to FIGURE 1, a flow meter unit is there shown. The flow meter unit comprises a main body 10 having an inlet section 12 which is threaded at 14 for receiving the end of a conduit communicating with a central lubricant pressure supply source. The connection with such a conduit may be by a conventional compression coupling, by a screw on connection, by a plug in connection, or by any means known in the art. The outlet end of the meter unit is provided with a threaded surface 16 which matingly engages a threaded aperture 18 in a support element 20 which is adjacent the bearing or point to be lubricated. The meter unit may be otherwise connected at its outlet to a bearing, e.g. by a tail tube which is a conduit leading from the meter unit to the bearing. At the outlet, also, the meter unit may be connected by a compression coupling, screw-in or plug-in means or other known means.

The main body 10 of the meter unit has an axial bore extending completely therethrough from its inlet to its outlet. The diameter of the bore varies along its length for different purposes, to be described.

Lubricant pumped by a central pump or lubricant pressure supply eventually reaches meter unit inlet section 12.

An interior sleeve 50 is press fitted within the bore in inlet section 12. Sleeve 50 has a collar 30 which may be beveled on its interior upstream rim to accommodate a compression coupling sleeve (not shown). The base 52 of sleeve 50 rests near filter 46, to be described.

After passing through inlet section 12 the pumped lubricant passes to and through a filter 46, which may be of a type well known in the art and may comprise loose fibers, steel wool, mesh fibers, a porous ceramic or similar porous element. A fiber filter 46 would be backed by a screen or strainer 48 which prevents the filter fibers from passing through the meter unit. Such a strainer is shown in U.S. Patent No. 3,217,750, issued Nov. 16, 1965 to the inventor hereof, entitled "Lubrication," and assigned to the assignee hereof.

After lubricant passes screen 48, it passes through the tapered bore section 54 into narrowed bore 60. Narrowed bore 60 has located within it a freely floating pin 62 which may be comprised of any material that is sufficiently rigid and strong to withstand the movement of the pin to be described, without flexing or expanding. The pin must be unaffected by the temperature or corrosive qualities of the lubricant material being pumped through the meter unit. The pin may be of metal, wood or inert plastic. The materials of the pin form no part of the present invention.

Apportionment of the volume of lubricant pumped through the meter unit bore is obtained by narrowing the pathway through which lubricant must move. As can be seen in FIGURE 2, the diameter of the pin 62 within the bore 60 is almost as great as the diameter of bore 60. The lubricant passing through tapered chamber 54 impinges upon the upper end 64 of pin 62 and exerts pressure thereon. It also passes through the open portion 66 of the bore 60 to impinge upon the valve element 70. The pressure of the lubricant passing through bore 60 plus the pressure on the end 64 of pin 62 is sufficient to move the valve element 70 as desired.

The valve element 70 is comprised of a disc of fluorinated silicone material designed in accordance with the present invention and described in detail below. If the disc 70 of fluorinated silicone material is so thin as to be flexed by the pressure thereon of the valve seat 80 to be described, or due to the pressure of the biasing spring 74 to be described, disc 70 may be mounted upon a backing plate 72 positioned on the side of disc 70 away from valve seat 80, which will give the resilient silicone disc 70 support against undesired bending.

The biasing means or compression spring 74 biases the valve element 70 against the valve seat 80. One end of spring 74 presses on plate 72 and the other end is seated on nonmovable plate 76 which is secured within the bore through meter unit section 10.

Valve seat 80, as can be seen in FIGURE 1, comprises an annual flange which is formed in the bore of the meter unit element 10 when the bore is formed. The flange 80, as shown in FIGURE 1, has a rounded lower edge which comes into engagement with disc 80, thereby minimizing the surface area of the valve seat 80 that contacts the resilient disc 70. Valve seat 80 sinks into disc 70 as spring 74 presses valve element 72 against annular ring 80, thereby ensuring a secure liquid-tight seal.

Valve element 72 is moved away from seat 80 by the pressure of lubricant being pumped against the upstream end 64 of pin 62, the pin being pressed against surface 78 of valve element 70, and of lubricant being pumped through bore portion 66 against the surface 78 of disc 70. After valve 70 opens, lubricant flows through the chamber 82 containing the spring 74 and through the apertures 84 in support plate 76 and thereafter passes through the tapered base 86 of the meter unit and out the conduit or tail tube 88 to the bearing or point to be lubricated.

Referring to FIGURES 1 and 3, the meter unit operates in the following manner. After lubricant has been pumped through filter 46 and into chamber 54, the lubricant under pressure operates upon the end of pin 62 and passes through the passage 66 in the bore 60 to press upon the valve element 70 to move same against the bias of spring 74 thereby to open a passageway 90, as shown in FIGURE 3, for the lubricant to pass the valve element 70 and thereafter to pass out of the meter unit. When the lubricant pump ceases operation and system pressure reduces, the force of spring 74 overcomes the pressure on valve element 70 by the pin 62 and by the lubricant within bore section 66 and presses the valve element 70 against the valve seat 80, thereby sealing the valve against any backflow of lubricant past the valve element 70.

The invention lies in the material of which the valve element 70 is comprised. As has been noted generally above, the valve element 70 is comprised of a fluorinated silicone member.

It has been found that the most desirable type of synthetic, rubber-like, fluorinated silicone material comprises long chain silicone polymers in which some hydrogen atoms have been replaced by fluorine atoms. Such a material may be a filled rubber which is based upon trifluoropropylmethylsiloxane units, sold by Dow Corning Co. and comprising a proprietary composition of their registered trademark products Silastic® LS-63U Fluorosilicone Rubber and Silastic® LS-422 Base. A more preferred material is a proprietary fluorinated silicone polymer substance sold by Ronthor Reiss Corp., U.S. 46, Little Falls, N.J.

Such fluorinated silicone materials are able to withstand lubricant being pumped past them for an extended period of time when the lubricant is either high or low aniline point oil and when it is at low or elevated temperatures. The materials will not shrink, harden, become brittle, swell, soften, lose their resiliency or disintegrate. For example, the materials can withstand low aniline point oil pumped at 160° F. for more than five years.

The fluorinated silicone valve element must be resilient and should have a Durometer or resiliency rating in the range of 60 to 80, preferably from 65 to 75, and most desirably 70, in order that the valve will properly operate.

It has been found that the smallest thickness of usable fluorinated silicone material that can be obtained, which thickness material has all of the other desired characteristics, is within the range of .010 to .025 inch. Such thickness will eliminate valve sticking and at the same time permit proper seating of the valve under the minimum pressures exerted by the compression spring 74 just after the central lubricating pump has ceased to pump.

With metal to fluorinated silicone disc contact, it is desirable that unevenness in the spacing of the valve from the valve seat be eliminated and that there, therefore, be a mirror finish or press polish finish on each disc. This finish can be provided prior to all cutting operations on the fluorinated silicone, or after the sheet of fluorinated silicone material has been cut into strips or after the strips have been individually punched into discs.

It has been found that providing a valve element formed of fluorinated silicone with smooth finish, a Durometer rating of 65 to 75 and a disc thickness of .015 to .025 inch gives the particular resiliency in connection with a metal valve seat 80 which enables the stoppage of lubricant flow without the tendency of the valve element cooperating with the valve seat to entrap impurities and without the valve element deteriorating after prolonged exposure to either high or low aniline point oils at either high or low temperatures.

In FIGURE 4 an installation is illustrated which may use a meter unit designed in accordance with the present invention. The central lubricating pump 100 which may be a gear pump, a piston pump, a pump having an eccentric element which rotates through a chamber in combination with a piston vane, or another conventional pump well known in the art, pumps lubricant through conduit 102 to junction 104. Junction 104 is connected by any well known means with meter unit 106, which meter unit is designed in accordance with the present invention. The meter unit apportions lubricant to the bearings 108. Lubricant also passes through main conduit 102 to junction 110 from where it is directed to meter unit 112 and passes to bearing 114. Lubricant also flows through and past junction 110 to junction 116. From there part of the lubricant passes through branch conduit 118 to meter unit 120 which serves bearing 122. The lubricant also passes directly from junction 116 into meter unit 119 which apportions the lubricant that then passes to a tail pipe or conduit 121 which is connected with remotely positioned bearing 123 to be lubricated.

The lubricant pumped by pump 100 may consist of any lubricating liquid, and may consist of either high or low aniline point oils. In addition, the reservoir from which the lubricant is pumped may contain heating elements which heat the lubricant. Alternatively, the pump may contain heating elements that heat the lubricant as it is pumped, or other heating means may be provided for heating the lubricant as it is pumped.

Although this invention has been described with respect to its preferred embodiments, it should be understood that many variations and modifications will now be obvious to those skilled in the art, and it is preferred, therefore, that the scope of the invention be limited not by the specific disclosure herein.

What is claimed is:
1. In a high restriction flow meter unit for an outlet of a centralized lubricant distributing system.
   said meter unit comprising a body having an axial bore extending therethrough and a flow restriction device within said bore for permitting a predetermined rate of flow through said meter unit;

a value within said bore for preventing backflow of lubricant through said meter unit; said valve comprising a valve seat fixed within said bore for engaging a movable valve element; a movable valve element engageable with said valve seat and movable away therefrom when lubricant is pumped through said meter unit; said valve element cooperating with said valve seat when in engagement therewith to close said bore;

a biasing means secured within said bore and in engagement with said valve element for normally biasing said valve element into engagement with said valve seat and for permitting said valve element to be moved away from said valve seat when lubricant is pumped through said meter unit;

the improvement comprising, said valve element being comprised of a fluorinated silicone polymer having the characteristics of being able to withstand prolonged use without deterioration when lubricant comprising oils within the range of high to low aniline point oils within a wide range of temperatures is pumped through said bore; said valve element having a surface which engages said valve seat; said surface being smooth whereby an effective seal with said valve seat is obtatined.

2. In the meter unit of claim 1, the improvement further comprising said valve element having a Durometer rating within the range of from 60 to 80.

3. In the meter unit of claim 1, the improvement further comprising said valve element being resilient to form a secure seal with said valve seat.

4. In the meter unit of claim 3, said valve element being mounted upon a rigid support plate; said biasing means being in contact with said plate;

the improvement further comprising, said valve element being of a thickness within the range of from .015 to .025 inch.

5. In the meter unit of claim 1, the improvement further comprising said valve seat comprising an annular ring secured within said bore which seals said bore in cooperation with said resilient valve element by being compressed into it.

References Cited

UNITED STATES PATENTS

| | | | |
|---|---|---|---|
| 2,324,402 | 7/1943 | Kocher | 151—120 XR |
| 2,927,765 | 3/1960 | Morris | 251—368 XR |
| 3,006,878 | 10/1961 | Talcott | 260—46.5 XR |
| 3,393,841 | 7/1968 | Brehmer | 185—7 XR |

OTHER REFERENCES

Pierce et al.: "Fluorosilicone Rubber," vol. 52, No. 9, September 1960, pp. 783–784.

FRED C. MATTERN, JR., Primary Examiner

M. A. ANTONAKAS, Assistant Examiner

U.S. Cl. X.R.

251—120, 368